(12) United States Patent
Jung et al.

(10) Patent No.: US 12,556,054 B2
(45) Date of Patent: Feb. 17, 2026

(54) STATOR WITH IMPROVED BUSBARS AND MOTOR INCLUDING THE SAME

(71) Applicant: HYUNDAI MOBIS Co., Ltd., Seoul (KR)

(72) Inventors: Jin Ho Jung, Yongin-si (KR); Seong Jun Hwang, Yongin-si (KR); Jong Bin Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 308 days.

(21) Appl. No.: 18/080,330

(22) Filed: Dec. 13, 2022

(65) Prior Publication Data

US 2023/0187993 A1 Jun. 15, 2023

(30) Foreign Application Priority Data

Dec. 14, 2021 (KR) .......................... 10-2021-0178505
Dec. 14, 2021 (KR) .......................... 10-2021-0178506

(51) Int. Cl.
*H02K 3/50* (2006.01)
*H02K 1/14* (2006.01)
(Continued)

(52) U.S. Cl.
CPC ............. *H02K 3/505* (2013.01); *H02K 1/148* (2013.01); *H02K 1/16* (2013.01); *H02K 3/28* (2013.01);
(Continued)

(58) Field of Classification Search
CPC ........ H02K 3/28; H02K 15/063; H02K 3/505; H02K 3/521; H02K 3/522; H02K 2203/09; H02K 2203/12
(Continued)

(56) References Cited

U.S. PATENT DOCUMENTS

2005/0227873 A1\* 10/2005 Leghissa ............... H10N 60/203
505/780
2014/0028127 A1\* 1/2014 Chamberlin ........... H02K 3/522
310/71
(Continued)

FOREIGN PATENT DOCUMENTS

CN 107768133 A \* 3/2018 ......... H01F 27/2823
CN 212627378 U \* 2/2021 ............... H02K 3/28
(Continued)

OTHER PUBLICATIONS

Translation of JP 2008043005 A (Year: 2008).\*
(Continued)

*Primary Examiner* — Oluseye Iwarere
*Assistant Examiner* — Daniel K Schlak
(74) *Attorney, Agent, or Firm* — MORGAN, LEWIS & BOCKIUS LLP

(57) ABSTRACT

A stator for a motor, the stator including a plurality of busbars, in which the plurality of busbars includes a first busbar, a second busbar, and a third busbar, two opposite ends of the first busbar are spaced apart from each other in a circumferential direction C and a radial direction R, two opposite ends of the second busbar are spaced apart from each other in the circumferential direction C and an axial direction A, and two opposite ends of the third busbar are spaced apart from each other in the circumferential direction C, the radial direction R, and the axial direction A.

17 Claims, 11 Drawing Sheets

(51) Int. Cl.
    *H02K 1/16*      (2006.01)
    *H02K 3/28*      (2006.01)
    *H02K 3/52*      (2006.01)

(52) U.S. Cl.
    CPC ............... *H02K 3/522* (2013.01); *H02K 3/50* (2013.01); *H02K 2203/09* (2013.01)

(58) Field of Classification Search
    USPC .................................. 310/201, 611; 361/611
    See application file for complete search history.

(56) References Cited

U.S. PATENT DOCUMENTS

| | | | |
|---|---|---|---|
| 2016/0254717 A1* | 9/2016 | Hoshina | H02K 3/18 310/71 |
| 2018/0152083 A1* | 5/2018 | Schmid | H02K 3/38 |

FOREIGN PATENT DOCUMENTS

| | | | | |
|---|---|---|---|---|
| EP | 2624415 A1 | * | 8/2013 | ............ H02K 3/522 |
| JP | 2004-96841 A | | 3/2004 | |
| JP | 2008043005 A | * | 2/2008 | ............... H02K 3/50 |
| JP | 2013162636 A | * | 8/2013 | ............... H02K 3/52 |
| WO | WO-2008071147 A2 | * | 6/2008 | ........... H02K 15/066 |

OTHER PUBLICATIONS

Translation of EP 2624415 A1 (Year: 2013).*
Translation of JP 2013162636 A (Year: 2013).*
Translation of CN 212627378 U (Year: 2021).*
Translation of CN 107768133 A (Year: 2018).*
Office Action issued in corresponding Korean Patent Application No. 10-2021-0178505 dated Oct. 31, 2025, with English translation.

* cited by examiner

## STATOR WITH IMPROVED BUSBARS AND MOTOR INCLUDING THE SAME

CROSS-REFERENCE TO RELATED APPLICATION

This application claims priority to and the benefit of Korean Patent Application No. 10-2021-0178505 filed in the Korean Intellectual Property Office on Dec. 14, 2021, and Korean Patent Application No. 10-2021-0178506 filed in the Korean Intellectual Property Office on Dec. 14, 2021, the entire contents of which are incorporated herein by reference.

TECHNICAL FIELD

The present disclosure relates to a stator for a motor and a motor including the same.

BACKGROUND ART

Development and production of hybrid vehicles, electric vehicles, and the like are being actively performed to solve the problems of environmental pollution caused by internal combustion engine vehicles in the related art and the problems of unstable supply of fuel caused by domestic and foreign environmental change.

The electric vehicle or the hybrid vehicle is equipped with a drive motor used to operate the vehicle. The motor has a structure in which a coil is wound around a stator core. To prevent the coil from being damaged by the stator core, an injection-molded product made of plastic material and called a bobbin is used for the motor. In the related art, the motor has a structure in which the stator core and the bobbin are assembled, and the coil is wound around the bobbin.

Meanwhile, the motor has a structure made by coupling a plurality of assemblies each including the stator core, the bobbin, and the coil. In particular, the plurality of assemblies constituting the drive motor for a vehicle is electrically connected to a power supply unit through terminals so that the plurality of assemblies may be supplied with power from the power supply unit.

However, in the related art, there are problems in that the volume occupied by the terminals is large, which increases the weight and costs of the drive motor for a vehicle, makes it difficult to use a space around the terminals, and complicates the structure of the drive motor.

SUMMARY

The present disclosure has been made in an effort to reduce a weight and costs of a drive motor for a vehicle, improve utilization of a space around the motor, and simplify a structure of the motor by eliminating a terminal in the related art.

An exemplary embodiment of the present disclosure provides a stator for a motor, the stator including: a plurality of assemblies arranged in a circumferential direction C; and a hole provided at a center thereof, in which the plurality of assemblies each includes: a stator core; a bobbin configured to surround an outer surface of the stator core; a coil wound around the bobbin multiple times and having incoming and outgoing lines respectively provided at two opposite ends thereof; and a plurality of busbars disposed on the bobbin, in which the plurality of busbars includes a first busbar, a second busbar, and a third busbar, in which two opposite ends of the first busbar based on the circumferential direction C are spaced apart from each other in the circumferential direction C and a radial direction R of the stator, in which two opposite ends of the second busbar based on the circumferential direction C are spaced apart from each other in the circumferential direction C and an axial direction A of the stator, and in which two opposite ends of the third busbar based on the circumferential direction C are spaced apart from each other in the circumferential direction C, the radial direction R, and the axial direction A of the stator.

One end B1-1 of the first busbar based on the circumferential direction C and one end B2-1 of the two opposite ends of the second busbar based on the circumferential direction C, which is disposed adjacent to one end B1-1 of the first busbar, may be disposed at a first height H1 in the axial direction A, and one end B3-1 of the two opposite ends of the third busbar based on the circumferential direction C, which is disposed adjacent to one end B1-1 of the first busbar and one end B2-1 of the second busbar, may be disposed at a second height H2 different from the first height H1 in the axial direction A.

The other end B1-2 of the first busbar based on the circumferential direction C may be disposed at the first height H1.

The other end B2-2 of the second busbar based on the circumferential direction C may be disposed at the second height H2.

The other end B3-2 of the third busbar based on the circumferential direction C may be disposed at the first height H1.

When the stator for a motor is viewed in the circumferential direction C, the other end B1-2 of the first busbar based on the circumferential direction C may overlap one end B2-1 of the second busbar.

When the stator for a motor is viewed in the circumferential direction C, the other end B2-2 of the second busbar based on the circumferential direction C may overlap one end B3-1 of the third busbar.

When the stator for a motor is viewed in the circumferential direction C, the other end B3-2 of the third busbar based on the circumferential direction C may overlap one end B1-1 of the first busbar.

The first busbar may have a shape bent primarily in a direction inclined with respect to the radial direction R and the circumferential direction C and then bent secondarily in the circumferential direction C while extending from one end B1-1 toward the other end B1-2.

The second busbar may have a shape bent primarily in a direction inclined with respect to the axial direction A and the circumferential direction C and then bent secondarily in the circumferential direction C while extending from one end B2-1 toward the other end B2-2.

The third busbar may have a shape bent primarily in a direction inclined with respect to the radial direction R and the circumferential direction C, bent secondarily in the circumferential direction C, bent tertiarily in a direction inclined with respect to the axial direction A and the circumferential direction C, and then bent quaternarily in the circumferential direction C while extending from one end B3-1 toward the other end B3-2.

The plurality of assemblies may be classified into one or more first assemblies, one or more second assemblies, and one or more third assemblies, the first assembly, the second assembly, and the third assembly may be alternately disposed in the circumferential direction C, one end B1-1 of the first busbar of the first assembly may be joined to the other end B3-2 of the third busbar of the second assembly, and the other end B1-2 of the first busbar of the first assembly may be joined to one end B2-1 of the second busbar of the third assembly.

One end B2-1 of the second busbar of the first assembly may be joined to the other end B1-2 of the first busbar of the second assembly, and the other end B2-2 of the second busbar of the first assembly may be joined to one end B3-1 of the third busbar of the third assembly.

One end B3-1 of the third busbar of the first assembly may be joined to the other end B2-2 of the second busbar of the second assembly, and the other end B3-2 of the third busbar of the first assembly may be joined to one end B1-1 of the first busbar of the third assembly.

One end B1-1 of the first busbar of the second assembly may be joined to the other end B3-2 of the third busbar of the third assembly.

One end B2-1 of the second busbar of the second assembly may be joined to the other end B1-2 of the first busbar of the third assembly.

One end B3-1 of the third busbar of the second assembly may be joined to the other end B2-2 of the second busbar of the third assembly.

The plurality of busbars may further include a fourth busbar, one end of the fourth busbar of the first assembly based on the circumferential direction C may be joined to one end of the fourth busbar of the second assembly based on the circumferential direction C, the other end of the fourth busbar of the first assembly based on the circumferential direction C may be joined to one end of the fourth busbar of the third assembly based on the circumferential direction C, and the other end of the fourth busbar of the second assembly based on the circumferential direction C may be joined to the other end of the fourth busbar of the third assembly based on the circumferential direction C.

The first to third busbars may be disposed on an outer portion of the bobbin based on the radial direction R, and the fourth busbar may be disposed on an inner portion of the bobbin based on the radial direction R.

Another exemplary embodiment of the present disclosure provides a motor including: a stator; and a rotor, in which the stator has a structure in which a plurality of assemblies is arranged in a circumferential direction C and a hole is provided at a center thereof, in which the plurality of assemblies each includes: a stator core; a bobbin configured to surround an outer surface of the stator core; a coil wound around the bobbin multiple times and having incoming and outgoing lines respectively provided at two opposite ends thereof; and a plurality of busbars disposed on the bobbin, in which the plurality of busbars includes a first busbar, a second busbar, and a third busbar, in which two opposite ends of the first busbar based on the circumferential direction C are spaced apart from each other in the circumferential direction C and a radial direction R of the stator, in which two opposite ends of the second busbar based on the circumferential direction C are spaced apart from each other in the circumferential direction C and an axial direction A of the stator, and in which two opposite ends of the third busbar based on the circumferential direction C are spaced apart from each other in the circumferential direction C, the radial direction R, and the axial direction A of the stator.

According to the present disclosure, it is possible to reduce the weight and costs of the drive motor for a vehicle, improve the utilization of the space around the motor, and simplify the structure of the motor by eliminating a terminal in the related art.

DETAILED DESCRIPTION

Hereinafter, a stator for a motor and a motor according to the present disclosure will be described with reference to the drawings.

Stator for Motor

Figure 1:
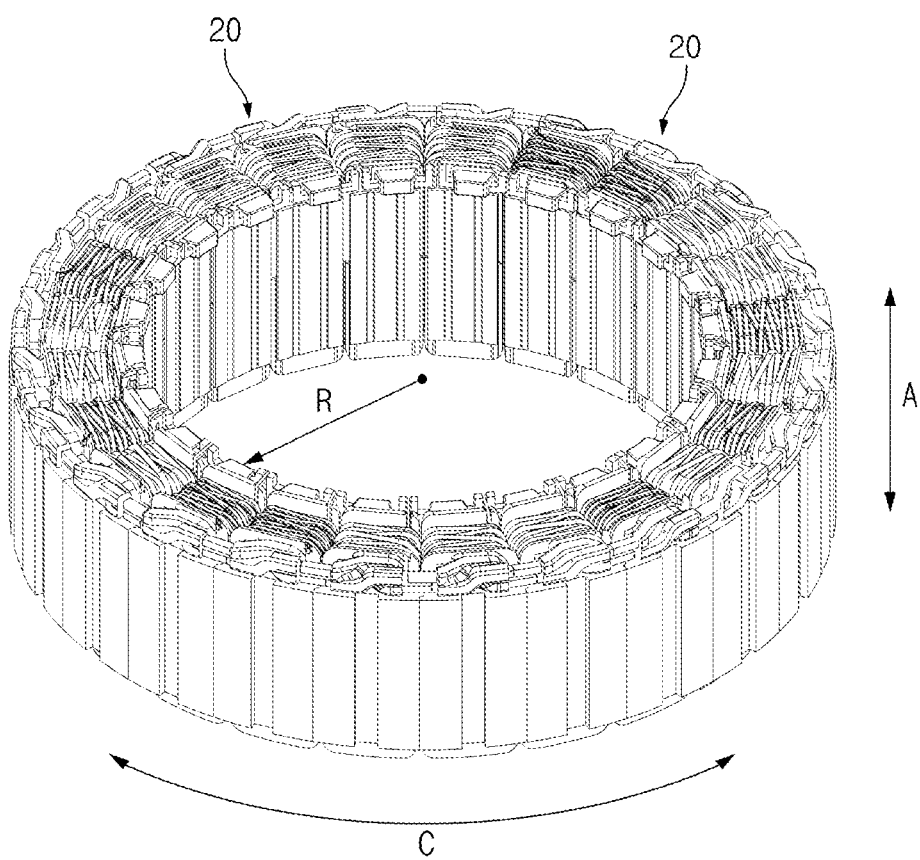
FIG. 1 is a perspective view illustrating a structure of a stator for a motor according to an embodiment of the present disclosure.
Figure 2:
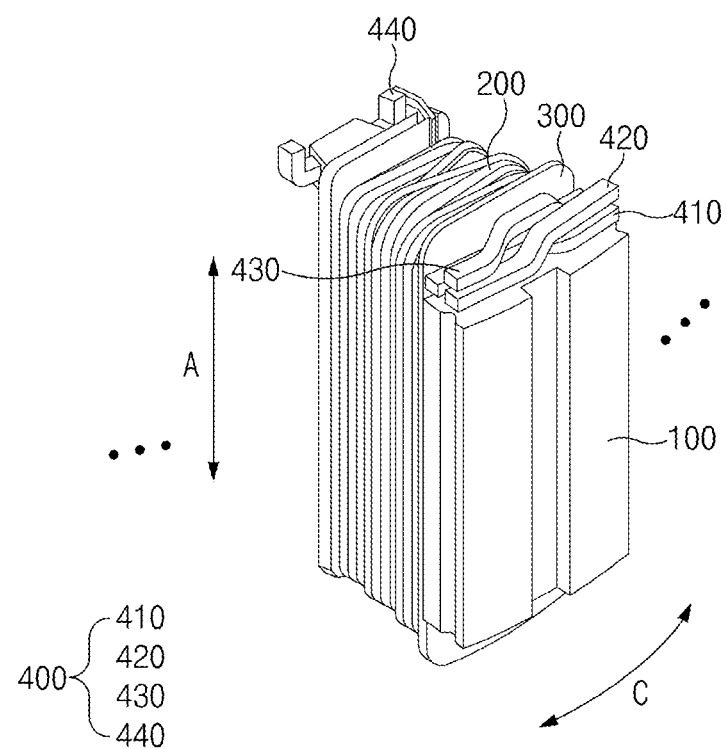
FIG. 2 is an enlarged perspective view of an assembly constituting the stator for a motor according to the embodiment of the present disclosure.
Figure 3:
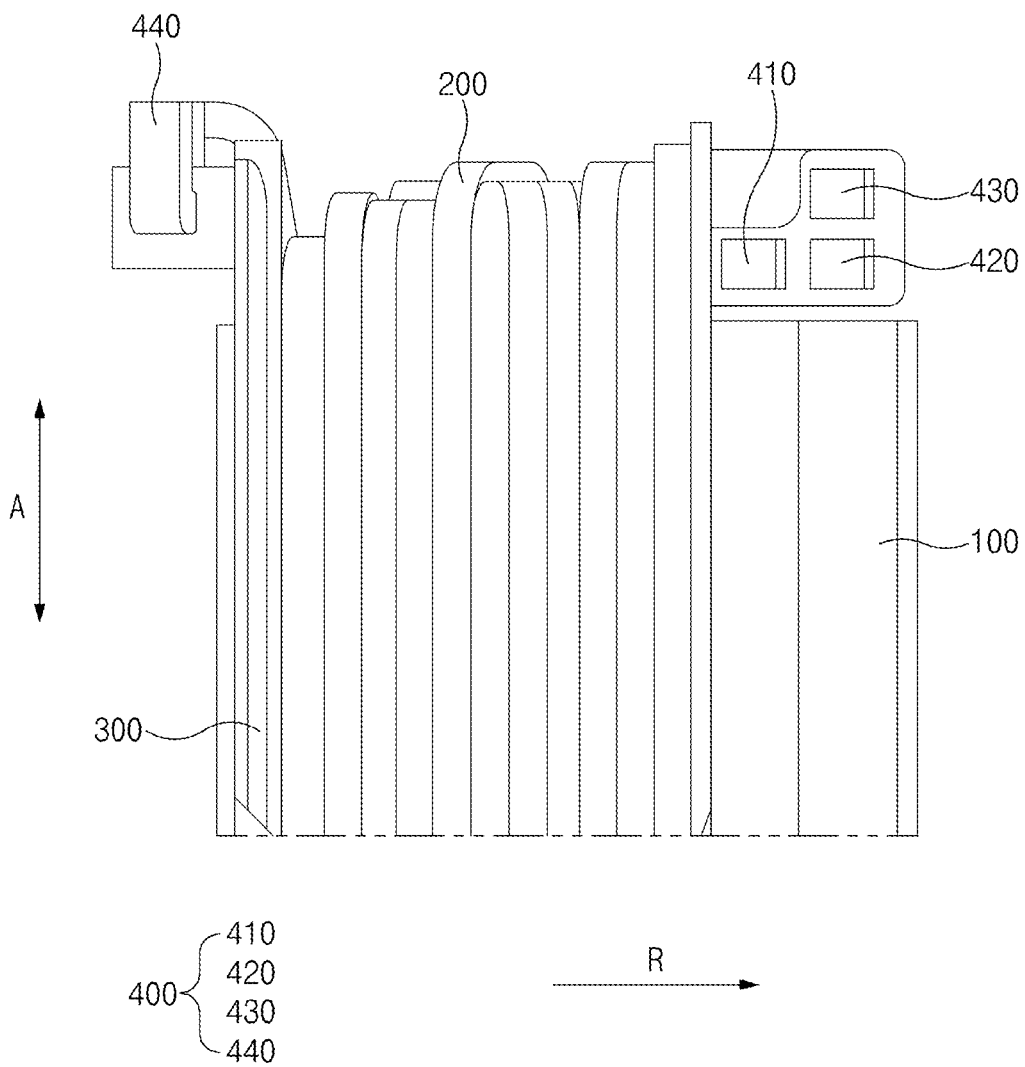
FIG. 3 is a cross-sectional view illustrating a state in which the assembly constituting the stator for a motor according to the embodiment of the present disclosure is cut in an axial direction.
Figure 4:
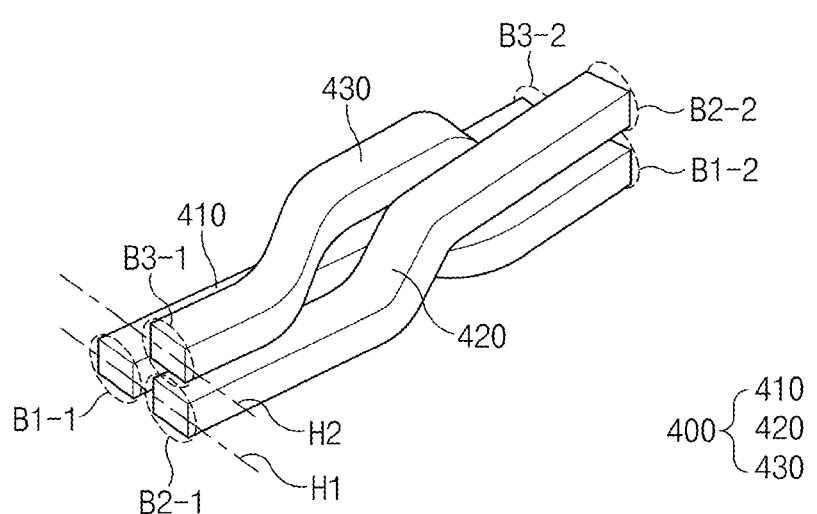
FIG. 4 is an enlarged perspective view of shapes of first to third busbars provided in the assembly according to the embodiment of the present disclosure.
Figure 5:
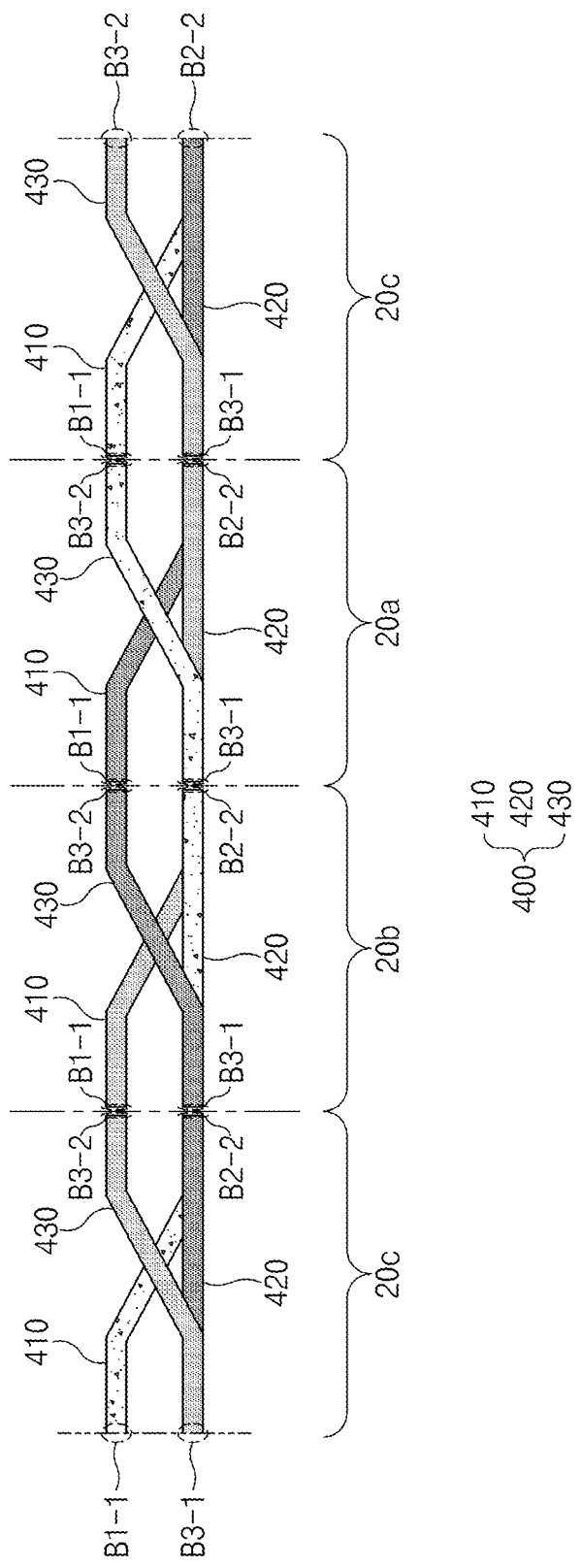
FIG. 5 is a view conceptually illustrating a structure for connecting the first to third busbars provided in first to third assemblies provided in the stator for a motor according to the embodiment of the present disclosure.

FIG. 1 is a perspective view illustrating a structure of a stator for a motor according to an embodiment of the present disclosure, and FIG. 2 is an enlarged perspective view of an assembly constituting the stator for a motor according to the embodiment of the present disclosure. FIG. 3 is a cross-sectional view illustrating a state in which the assembly constituting the stator for a motor according to the embodiment of the present disclosure is cut in an axial direction, and FIG. 4 is an enlarged perspective view of shapes of first to third busbars provided in the assembly according to the embodiment of the present disclosure. In addition, FIG. 5 is a view conceptually illustrating a structure for connecting the first to third busbars provided in first to third assemblies provided in the stator for a motor according to the embodiment of the present disclosure.

Referring to the drawings, a stator 10 for a motor (hereinafter, referred to as a 'stator') according to the present disclosure may have a structure in which a plurality of assemblies 20 is arranged in a circumferential direction C of the stator 10 and a hole is provided at a center thereof. As described below, a rotor may be disposed in the hole. FIG. 1 illustrates a state in which the plurality of assemblies 20 is arranged in an approximately circular shape, such that the circular hole is provided. Unlike such a shape, the plurality of assemblies may be arranged in various closed loop shapes, and the hole may also have a shape corresponding to the shape of the plurality of assemblies.

In addition, the plurality of assemblies 20 constituting the stator 10 may each include a stator core 100, a coil 200, and a bobbin 300. In this case, the bobbin 300 may be provided to surround an outer surface of the stator core 100. It can be understood that the stator core 100 is structured to be inserted into a vacant space provided in the bobbin 300.

Meanwhile, the coil 200 may surround an outer surface of the bobbin 300 by being wound around the outer surface of the bobbin 300 multiple times. An incoming line and an outgoing line may be provided at two opposite ends of the coil 200 based on a longitudinal direction of the coil 200. The incoming and outgoing lines may protrude to the outside.

According to the present disclosure, when a current flows through the coil 200, a magnetic field is formed around the coil 200, and the rotor is rotated by an induced electromotive force generated in the rotor provided in the motor by a change in magnetic field. Because the operational principle of the motor is widely known in the related art, a description thereof will be omitted from the present specification.

Meanwhile, the stator 10 according to the present disclosure may further include a plurality of busbars 400 disposed on the bobbin 300. The busbars 400 may provide paths through which the assemblies 20 constituting the stator 10 are supplied with power from a power supply unit. To this end, any one of the plurality of busbars 400 provided in each of the assemblies 20 may be connected to the incoming line. In addition, another of the plurality of busbars 400 provided in each of the assemblies 20 may be connected to the outgoing line. More particularly, the incoming line may be joined to any one of the plurality of busbars 400, and the outgoing line may be joined to another of the plurality of busbars 400. For example, the joining may be implemented by welding.

Meanwhile, the plurality of assemblies 20 constituting the stator 10 according to the present disclosure may have the same structure. In this case, it can be understood that the configuration in which the plurality of assemblies 20 has the same structure means that the plurality of assemblies has the identity to the extent that those skilled in the art can recognize the plurality of assemblies as interchangeable components when glancing the relative positions of the stator cores, the coils, the bobbins, and the busbars that constitute the plurality of assemblies.

According to the present disclosure, the plurality of assemblies 20 constituting the stator 10 may be grouped into a plurality of groups. For example, referring to FIG. 5, the plurality of assemblies 20 may be divided into one or more first assemblies 20a, one or more second assemblies 20b, and one or more third assemblies 20c. However, this does not mean that the first to third assemblies have different structures. In contrast, according to the exemplary embodiment of the present disclosure, the first to third assemblies 20a, 20b, and 20c may have the same structure. As described below, the first to third assemblies 20a, 20b, and 20c may be classified depending on the phases of power supplied from the power supply unit.

More specifically, referring to FIGS. 1 and 5, the stator 10 may have a structure in which the first assemblies 20a, the second assemblies 20b, and the third assemblies 20c are alternately disposed in the circumferential direction C.

For example, the second assembly 20b and the third assembly 20c may be respectively disposed at one side and the other opposite side of the first assembly 20a based on the circumferential direction C. The first assembly 20a and the third assembly 20c may be respectively disposed at one side and the other opposite side of the second assembly 20b based on the circumferential direction C. The first assembly 20a and the second assembly 20b may be respectively disposed at one side and the other opposite side of the third assembly 20c. Therefore, the numbers of first to third assemblies provided in the stator 10 may be equal to one another.

Referring to the drawings, some of the busbars 400 provided in the assemblies 20 of the stator 10 according to the present disclosure may intersect others of the plurality of busbars 400.

More specifically, the busbars 400 may include a first busbar 410, a second busbar 420, a third busbar 430, and a fourth busbar 440.

In this case, according to the present disclosure, the first to third busbars 410, 420, and 430 are structured to intersect one another. In contrast, the first to third busbars 410, 420, and 430 may not intersect the fourth busbar 440. Therefore, the present disclosure adopts the plurality of busbars while eliminating terminals for connecting a motor to a power supply unit in the related art. Therefore, it is possible to reduce the volume, weight, and costs that were required to install the terminals in the related art.

In particular, according to the present disclosure, because some of the plurality of busbars 400 provided in the assemblies 20 are structured to intersect one another, it is possible to minimize the volume that was occupied by a plurality of busbars serving as the terminals in the related art. Therefore, according to the present disclosure, it is possible to reduce the volume of the motor for a vehicle and simplify the structure of the motor for a vehicle. Hereinafter, the structures of the first to fourth busbars 410, 420, 430, and 440 will be described in detail.

Referring to FIGS. 2 to 4, two opposite ends B1-1 and B1-2 of the first busbar 410 based on the circumferential direction C may be spaced apart from each other in the circumferential direction C and a radial direction R of the stator 10. Two opposite ends B2-1 and B2-2 of the second busbar 420 based on the circumferential direction C may be spaced apart from each other in the circumferential direction C and an axial direction A of the stator 10. Two opposite ends B3-1 and B3-2 of the third busbar 430 based on the circumferential direction C may be spaced apart from each other in the circumferential direction C, the radial direction R, and the axial direction A of the stator 10. This configuration may be understood as the structure in which the first to third busbars 410, 420, and 430 intersect one another in a three-dimensional space.

For example, as illustrated in FIGS. 2 to 4, according to the present disclosure, in one assembly 20, one end B1-1 of the first busbar 410 based on the circumferential direction C and one end B2-1 of the two opposite ends of the second busbar 420 based on the circumferential direction C, which is disposed adjacent to one end B1-1 of the first busbar 410, may be disposed at a first height H1 in the axial direction A, and one end B3-1 of the two opposite ends of the third busbar 430 based on the circumferential direction C, which is disposed adjacent to one end B1-1 of the first busbar 410 and one end B2-1 of the second busbar 420, may be disposed at a second height H2 different from the first height H1 in the axial direction A.

In addition, according to the present disclosure, the other end B1-2 of the first busbar 410 based on the circumferential direction C, which is disposed opposite to one end B1-1 of the first busbar 410, may be disposed at the first height H1, and the other end B2-2 of the second busbar 420 based on the circumferential direction C, which is disposed opposite to one end B2-1 of the second busbar 420, may be disposed at the second height H2. In addition, the other end B3-2 of the third busbar 430 based on the circumferential direction C, which is disposed opposite to one end B3-1 of the third busbar 430, may be disposed at the first height H1.

Meanwhile, in the present specification, it can be said that two components are disposed at the same height when there is a region in which the two components overlap in the axial direction A when the stator for a motor or the motor is viewed from the outside in the radial direction R.

Referring to FIGS. 1 to 4, when the stator 10 is viewed in the circumferential direction C, the other end B1-2 of the first busbar 410 may overlap one end B2-1 of the second busbar 420. This configuration may be understood as a configuration in which the other end B1-2 of the first busbar 410 and one end B2-1 of the second busbar 420 are disposed at positions corresponding to each other in the radial direction R of the stator 10.

In addition, when the stator 10 is viewed in the circumferential direction C, the other end B2-2 of the second busbar 420 may overlap one end B3-1 of the third busbar 430. This configuration may be understood as a configuration in which the other end B2-2 of the second busbar 420 and one end B3-1 of the third busbar 430 are disposed at positions corresponding to each other in the radial direction R of the stator 10.

In addition, when the stator 10 is viewed in the circumferential direction C, the other end B3-2 of the third busbar 430 may overlap one end B1-1 of the first busbar 410. This configuration may be understood as a configuration in which the other end B3-2 of the third busbar 430 and one end B1-1 of the first busbar 410 are disposed at positions corresponding to each other in the radial direction R of the stator 10.

Meanwhile, according to the present disclosure, the first to third busbars 410, 420, and 430 may each have a predetermined bent shape in order to implement the above-mentioned features.

For example, referring to FIGS. 2 to 4, the first busbar 410 may have a shape bent primarily in a direction inclined with respect to the radial direction R and the circumferential direction C and then bent secondarily in the circumferential direction C while extending from one end B1-1 toward the other end B1-2.

In addition, the second busbar 420 may have a shape bent primarily in a direction inclined with respect to the axial direction A and the circumferential direction C and then bent secondarily in the circumferential direction C while extending from one end B2-1 toward the other end B2-2.

In addition, the third busbar 430 may have a shape bent primarily in a direction inclined with respect to the radial direction R and the circumferential direction C, bent secondarily in the circumferential direction C, bent tertiarily in a direction inclined with respect to the axial direction A and the circumferential direction C, and then bent quaternarily in the circumferential direction C while extending from one end B3-1 toward the other end B3-2.

Hereinafter, coupling relationships between the first assembly 20a, the second assembly 20b, and the third assembly 20c provided in the stator 10 according to the present disclosure will be described in detail with reference to FIGS. 4 and 5.

Referring to FIGS. 4 and 5, the first to third assemblies 20a, 20b, and 20c of the stator may be arranged to intersect in the circumferential direction C (see FIG. 1). More specifically, the second assembly 20b may be disposed at one side of the first assembly 20a based on the circumferential direction, and the third assembly 20c may be disposed at the other side of the first assembly 20a based on the circumferential direction. In addition, the third assembly 20c may be disposed at one side of the second assembly 20b based on the circumferential direction, and the first assembly 20a may be disposed at the other side of the second assembly 20b based on the circumferential direction.

Referring to FIGS. 4 and 5 and the above-mentioned description, one end B1-1 of the first busbar 410 of the first assembly 20a may be joined to the other end B3-2 of the third busbar 430 of the second assembly 20b, and the other end B1-2 of the first busbar 410 of the first assembly 20a may be joined to one end B2-1 of the second busbar 420 of the third assembly 20c. In this case, it should be interpreted that the configuration in which one end and the other end of the busbars are joined to each other includes not only a case in which one end and the other end are joined directly to each other by welding or the like, but also a case in which one end and the other end are joined indirectly to each other by welding or the like after the incoming line and the outgoing line of the coil 200 are disposed between one end and the other end.

In addition, one end B2-1 of the second busbar 420 of the first assembly 20a may be joined to the other end B1-2 of the first busbar 410 of the second assembly 20b, and the other end B2-2 of the second busbar 420 of the first assembly 20a may be joined to one end B3-1 of the third busbar 430 of the third assembly 20c.

In addition, one end B3-1 of the third busbar 430 of the first assembly 20a may be joined to the other end B2-2 of the second busbar 420 of the second assembly 20b, and the other end B3-2 of the third busbar 430 of the first assembly 20a may be joined to one end B1-1 of the first busbar 410 of the third assembly 20c.

Referring to FIGS. 4 and 5, one end B1-1 of the first busbar 410 of the second assembly 20b may be joined to the other end B3-2 of the third busbar 430 of the third assembly 20c. In addition, one end B2-1 of the second busbar 420 of the second assembly 20b may be joined to the other end B1-2 of the first busbar 410 of the third assembly 20c. In addition, one end B3-1 of the third busbar 430 of the second assembly 20b may be joined to the other end B2-2 of the second busbar 420 of the third assembly 20c.

Meanwhile, referring to the drawings, one end of the fourth busbar 440 of the first assembly 20a based on the circumferential direction C may be joined to one end of the fourth busbar 440 of the second assembly 20b based on the circumferential direction C. The other end of the fourth busbar 440 of the first assembly 20a based on the circumferential direction C may be joined to one end of the fourth busbar 440 of the third assembly 20c based on the circumferential direction C. In addition, the other end of the fourth busbar 440 of the second assembly 20b based on the circumferential direction C may be joined to the other end of the fourth busbar 440 of the third assembly 20c based on the circumferential direction C.

Meanwhile, as illustrated in FIGS. 1 and 2, the first to third busbars 410, 420, and 430 may be disposed on an outer portion of the bobbin 300 based on the radial direction R, and the fourth busbar 440 may be disposed on an inner portion of the bobbin 300 based on the radial direction R. However, unlike the configuration illustrated in the drawings, the first to third busbars 410, 420, and 430 may be disposed on the inner portion of the bobbin 300 based on the radial direction R, and the fourth busbar 440 may be disposed on the outer portion of the bobbin 300 based on the radial direction R. Alternatively, the first to third busbars 410, 420, and 430 may be disposed at one side of the bobbin 300 based on the axial direction A, and the fourth busbar 440 may be disposed at the other side of the bobbin 300 based on the axial direction A.

Figure 6:
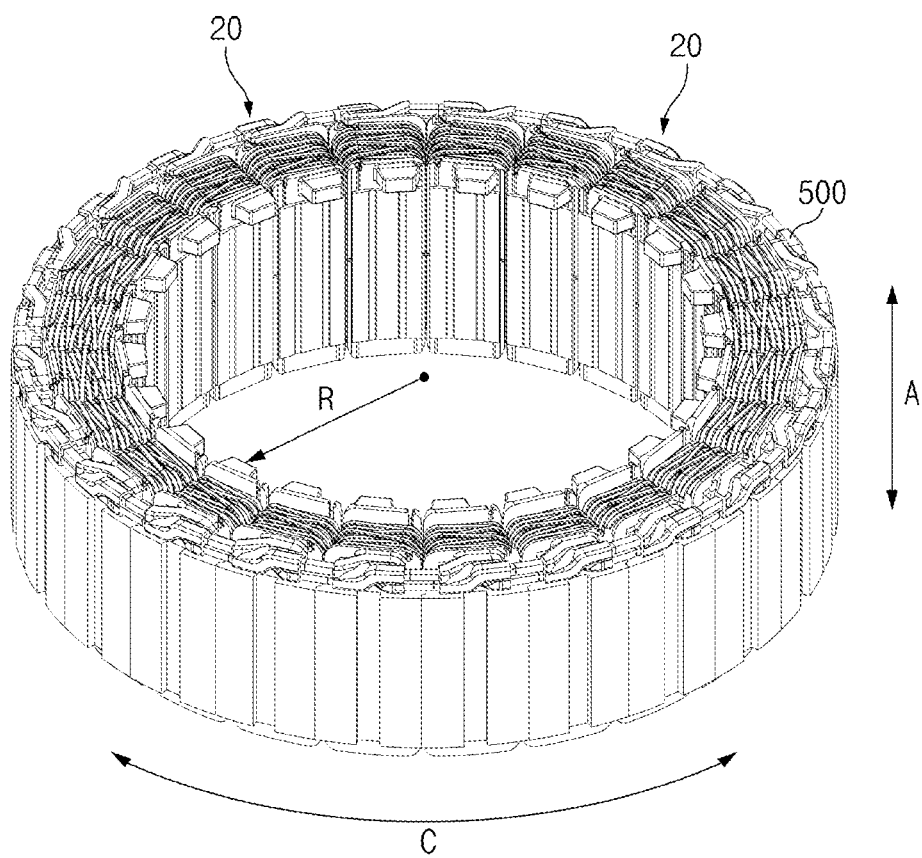
FIG. 6 is a perspective view illustrating a structure of a stator for a motor according to another embodiment of the present disclosure.
Figure 7:
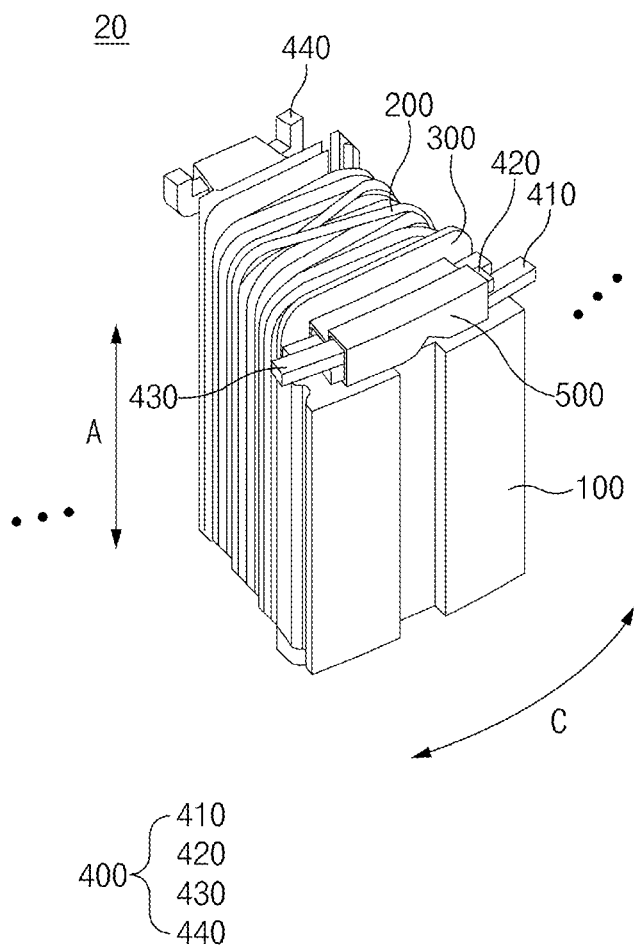
FIG. 7 is an enlarged perspective view of an assembly constituting the stator for a motor according to another embodiment of the present disclosure.
Figure 8:
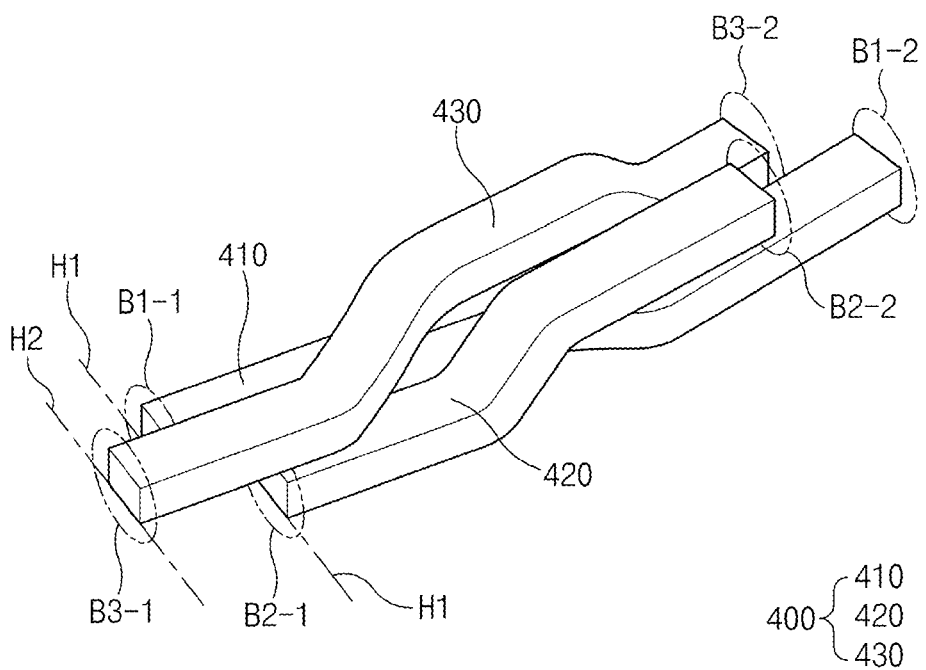
FIG. 8 is an enlarged perspective view of shapes of first to third busbars provided in the assembly according to another embodiment of the present disclosure.
Figure 9:
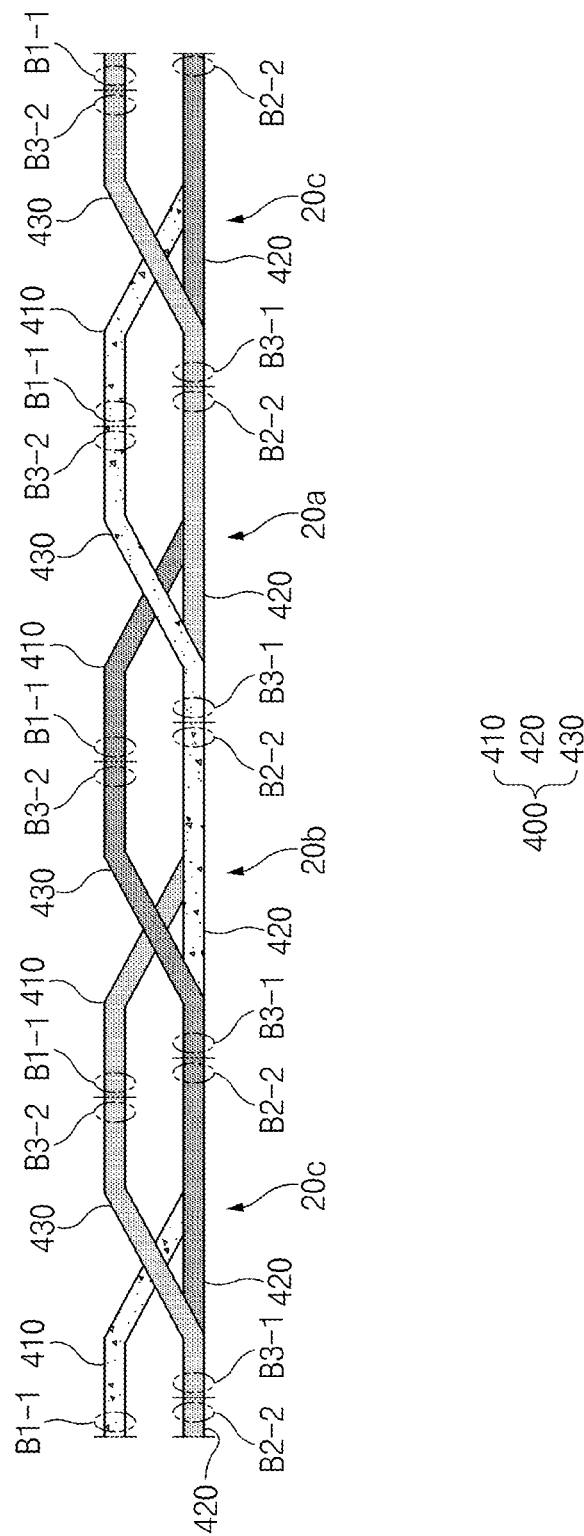
FIG. 9 is a view conceptually illustrating a structure for connecting the first to third busbars provided in first to third assemblies provided in the stator for a motor according to another embodiment of the present disclosure.

FIG. 6 is a perspective view illustrating a structure of a stator for a motor according to another embodiment of the present disclosure, and FIG. 7 is an enlarged perspective view of an assembly constituting the stator for a motor according to another embodiment of the present disclosure. FIG. 8 is an enlarged perspective view of shapes of first to third busbars provided in the assembly according to another embodiment of the present disclosure, and FIG. 9 is a view conceptually illustrating a structure for connecting the first to third busbars provided in first to third assemblies provided in the stator for a motor according to another embodiment of the present disclosure.

The above-mentioned contents related to the stator according to the embodiment of the present disclosure may be equally applied to the stator according to another embodiment of the present disclosure. However, another embodiment of the present disclosure differs from the above-mentioned embodiment of the present disclosure in terms of relative positions of one end B1-1, one end B2-1, and one end B3-1 and the other end B1-2, the other end B2-2, and the other end B3-2 respectively provided on the first to third busbars 410, 420, and 430.

More specifically, according to another embodiment of the present disclosure, one end B1-1, one end B2-1, and one end B3-1 respectively provided on the first to third busbars 410, 420, and 430 may be spaced apart from one another in the circumferential direction C. The other end B1-2, the other end B2-2, and the other end B3-2 respectively provided on the first to third busbars 410, 420, and 430 may be spaced apart from one another in the circumferential direction C.

As described below, two busbars respectively provided in adjacent two assemblies are joined to each other and define a joint portion. In this case, when the joint portions are disposed adjacent to each other, the joint portions may be easily electrically connected to one another by external impact or foreign substances. This situation acts as a fatal factor in respect to the insulation of the stator for a motor and the motor.

However, according to the present disclosure, the two opposite ends of the first busbar 410 based on the circumferential direction, the two opposite ends of the second busbar 420 based on the circumferential direction, and the two opposite ends of the third busbar 430 based on the circumferential direction may be spaced apart from one another in the circumferential direction. Therefore, the joint portions, which are each formed when two busbars provided in two adjacent assemblies are joined to each other, may also be spaced apart from one another in the circumferential direction, such that the distances between the joint portions may be maximized. Therefore, according to the present disclosure, the insulation of the stator for a motor and the motor may be remarkably improved.

Hereinafter, the features of the first to third busbars for improving the insulation of the stator for a motor and the motor will be described in detail.

Referring to FIGS. 7 and 8, in the assembly, one end B1-1 of the first busbar 410 may be spaced apart from one end B2-1 of the second busbar 420 in the circumferential direction C and the radial direction R. In addition, one end B2-1 of the second busbar 420 may be spaced apart from one end B3-1 of the third busbar 430 in the circumferential direction C and the axial direction A. In addition, one end B3-1 of the third busbar 430 may be spaced apart from one end B1-1 of the first busbar 410 in the circumferential direction C, the radial direction R, and the axial direction A.

More specifically, one end B1-1 of the first busbar 410 may be disposed closer to an outer side of the assembly 20 based on circumferential direction C than is one end B2-1 of the second busbar 420. In addition, one end B1-1 of the first busbar 410 may be disposed closer to an inner side of the assembly 20 based on the circumferential direction C than is one end B3-1 of the third busbar 430.

Referring to FIGS. 7 and 8, in the assembly, the other end B1-2 of the first busbar 410 may be spaced apart from the other end B2-2 of the second busbar 420 in the circumferential direction C and the axial direction A. In addition, the other end B2-2 of the second busbar 420 may be spaced apart from the other end B3-2 of the third busbar 430 in the circumferential direction C, the radial direction R, and the axial direction A. In addition, the other end B3-2 of the third busbar 430 may be spaced apart from the other end B1-2 of the first busbar 410 in the circumferential direction C and the radial direction R.

More specifically, the other end B3-2 of the third busbar 430 may be disposed closer to the inner side of the assembly 20 based on the circumferential direction C than is the other end B1-2 of the first busbar 410. In addition, the other end B3-2 of the third busbar 430 may be disposed closer to the outer side of the assembly 20 than is the other end B2-2 of the second busbar 420.

In the best case, as illustrated in FIGS. 7 and 8, in the assembly 20, the other end B1-2 of the first busbar 410 may protrude beyond the width of the bobbin 300 in the circumferential direction C, and one end B3-1 of the third busbar 430 may protrude beyond the width of the bobbin 300 in the circumferential direction C. In contrast, the two opposite ends B2-1 and B2-2 of the second busbar 420 may be provided within the width of the bobbin 300 in the circumferential direction C.

Referring to FIGS. 7 and 8, one end B1-1 of the first busbar 410 may be disposed to correspond to a boundary of the width of the bobbin 300 in the circumferential direction C. This configuration may mean that one end B1-1 of the first busbar 410 does not substantially protrude outward nor inward from the boundary of the width of the bobbin 300 in the circumferential direction C.

In addition, the other end B3-2 of the third busbar 430 may be disposed to correspond to the boundary of the width of the bobbin 300 in the circumferential direction C. This configuration may mean that the other end B3-2 of the third busbar 430 does not substantially protrude outward nor inward from the boundary of the width of the bobbin 300 in the circumferential direction C.

Meanwhile, referring to FIG. 6, the stator 10 according to the present disclosure may further include an insulation member 500 configured to accommodate the first to third busbars 410, 420, and 430. The insulation member 500 may serve to ensure the insulation of the stator 10 or the motor by preventing adjacent busbars from being electrically connected to each other in a situation that is not intended in design. The insulation member 500 may be integrated as one piece for accommodating all the first to third busbars 410, 420, and 430 provided in the stator 10.

In this case, a plurality of openings may be formed in a region of the insulation member 500 that faces the two opposite ends B1-1, B1-2, B2-1, B2-2, B3-1, and B3-2 of each of the first to third busbars 410, 420, and 430 based on the circumferential direction C so that the two opposite ends B1-1, B1-2, B2-1, B2-2, B3-1, and B3-2 of each of the first to third busbars 410 based on the circumferential direction C are exposed to the outside. The plurality of openings may be configured to provide spaces in which the incoming line of the coil may be joined to the first to third busbars 410, 420, and 430.

In this case, as illustrated in FIGS. 6 to 8, according to another embodiment of the present disclosure, in one assembly 20, the openings formed in the region of the insulation member 500, which faces one end B1-1, one end B2-1, and one end B3-1 of the first to third busbars 410, 420, and 430, may communicate with one another. In addition, in one assembly 20, the openings formed in the region of the insulation member 500, which faces the other end B1-2, the other end B2-2, and the other end B3-2 of the first to third busbars 410, 420, and 430, may communicate with one another.

Figure 10:
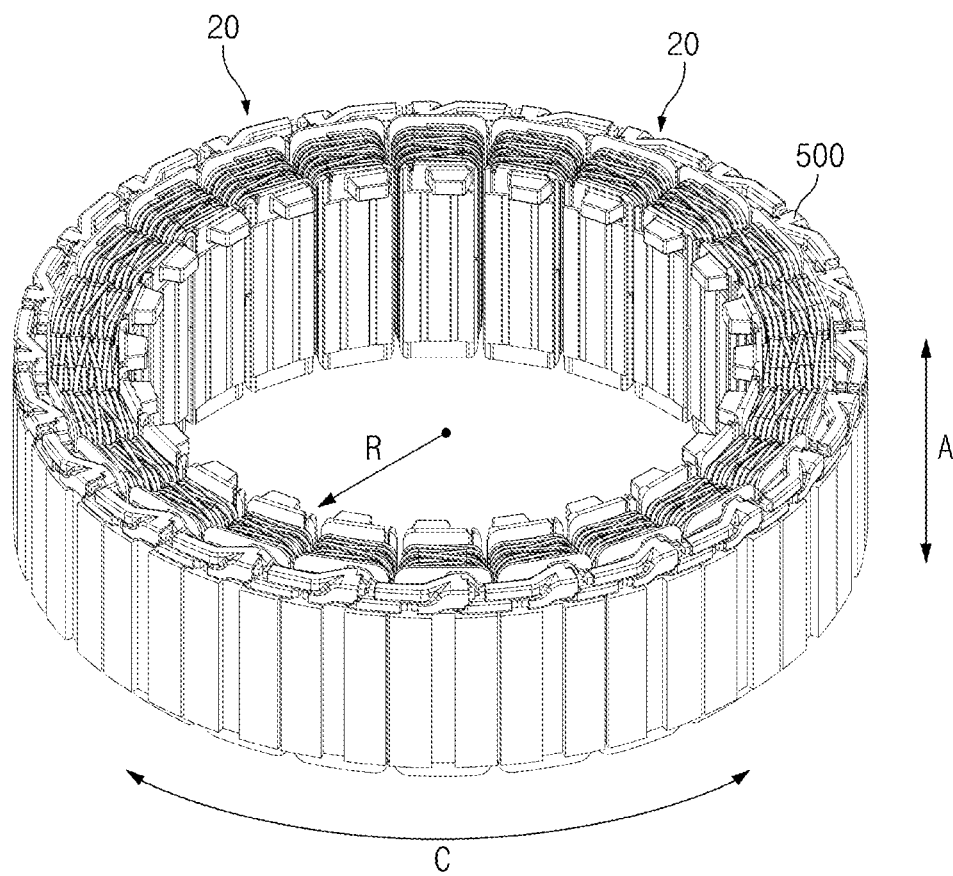
FIG. 10 is a perspective view illustrating a structure of a stator for a motor according to still another embodiment of the present disclosure.
Figure 11:
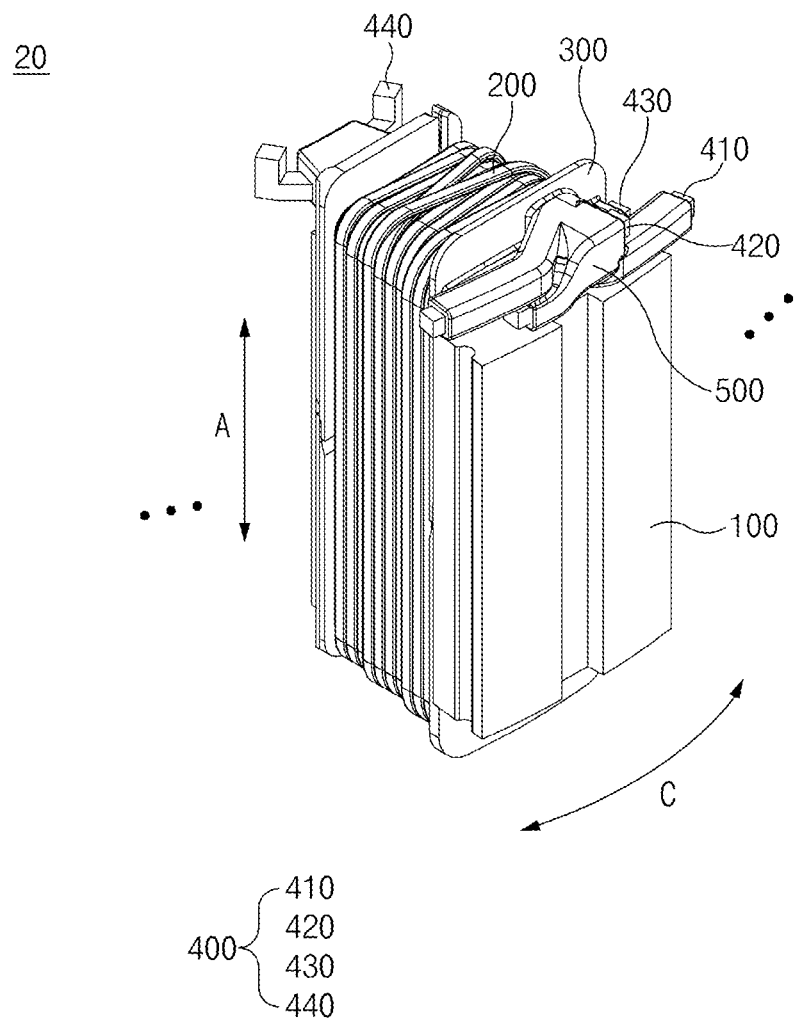
FIG. 11 is an enlarged perspective view illustrating an assembly constituting the stator for a motor according to still another embodiment of the present disclosure.

FIG. 10 is a perspective view illustrating a structure of a stator for a motor according to still another embodiment of the present disclosure, and FIG. 11 is an enlarged perspective view illustrating an assembly constituting the stator for a motor according to still another embodiment of the present disclosure. The above-mentioned contents may be applied, without change, to the stator for a motor according to still another embodiment of the present disclosure, except for the following description related to the insulation member 500.

Referring to FIGS. 10 and 11, according to still another embodiment of the present disclosure, in one assembly 20, the openings formed in the region of the insulation member 500, which faces one end B1-1, one end B2-1, and one end B3-1 of the first to third busbars 410, 420, and 430, may be spaced apart from one another in the circumferential direction C. In addition, in one assembly 20, the openings formed in the region of the insulation member 500, which faces the other end B1-2, the other end B2-2, and the other end B3-2 of the first to third busbars 410, 420, and 430, may be spaced apart from one another in the circumferential direction C. In this case, a partial region of the insulation member 500 is disposed between one end B1-1, one end B2-1, and one end B3-1 and between the other end B1-2, the other end B2-2, and the other end B3-2 of the first to third busbars 410, 420, and 430, such that the insulation of the stator may be further improved.

Motor

Referring to the drawings, a motor according to the present disclosure may include the stator 10, and the rotor (not illustrated) disposed in the hole provided in the stator 10. The stator 10 may have the structure in which the plurality of assemblies 20 is disposed in the circumferential direction C and the hole is provided at a center thereof. The plurality of assemblies 20 may each include the stator core 100, the bobbin 300 configured to surround the outer surface of the stator core 100, the coil 200 wound around the bobbin 300 multiple times and having the incoming line and the outgoing line respectively provided at the two opposite ends thereof, and the plurality of busbars 410, 420, 430, and 440 disposed on the bobbin 300.

Further, the plurality of busbars may include the first busbar 410, the second busbar 420, and the third busbar 430.

In this case, according to the present disclosure, in one assembly 20, the two opposite ends B1-1 and B1-2 of the first busbar 410 based on the circumferential direction C may be spaced apart from each other in the circumferential direction C and the radial direction R of the stator 10. The two opposite ends B2-1 and B2-2 of the second busbar 420 based on the circumferential direction C may be spaced apart from each other in the circumferential direction C and the axial direction A of the stator 10. The two opposite ends B3-1 and B3-2 of the third busbar 430 based on the circumferential direction C may be spaced apart from each other in the circumferential direction C, the radial direction R, and the axial direction A of the stator 10. This configuration may be understood as the structure in which the first to third busbars 410, 420, and 430 intersect one another in a three-dimensional space.

Meanwhile, the above-mentioned description of the stator for a motor according to the present disclosure may be equally applied to the motor according to the present disclosure.

The present disclosure has been described with reference to the limited embodiments and the drawings, but the present disclosure is not limited thereto. The present disclosure may be carried out in various forms by those skilled in the art, to which the present disclosure pertains, within the technical spirit of the present disclosure and the scope equivalent to the appended claims.

What is claimed is:

1. A stator for a motor, the stator comprising:
a plurality of assemblies arranged in a circumferential direction C of the stator; and
a hole provided at a center of the plurality of assemblies,
wherein each of the plurality of assemblies comprises:
a stator core;
a bobbin configured to surround an outer surface of the stator core;
a coil wound around the bobbin multiple times and having incoming and outgoing lines respectively provided at two opposite ends thereof; and
a plurality of busbars disposed on the bobbin,
wherein the plurality of busbars comprises a first busbar, a second busbar, and a third busbar,
wherein two opposite ends of the first busbar in a circumferential direction C of the first bus bar are spaced apart from each other in the circumferential direction C and a radial direction R of the stator,
wherein two opposite ends of the second busbar in a circumferential direction C of the second bus bar are spaced apart from each other in the circumferential direction C and an axial direction A of the stator, and
wherein two opposite ends of the third busbar in a circumferential direction C of the third busbar are spaced apart from each other in the circumferential direction C, the radial direction R, and the axial direction A of the stator,
wherein the third busbar has a shape bent primarily in a direction inclined with respect to the radial direction R and the circumferential direction C of the stator, bent secondarily in the circumferential direction C of the stator, bent tertiarily in a direction inclined with respect to the axial direction A and the circumferential direction C of the stator, and then bent quaternarily in the circumferential direction C of the stator while extending from one end B3-1 of the third busbar toward the other end B3-2 of the third busbar,
wherein one end B1-1 of the first busbar in the circumferential direction C of the first bus bar and one end B2-1 of the two opposite ends of the second busbar in the circumferential direction C of the second busbar, which is disposed adjacent to the one end B1-1 of the first busbar, are disposed at a first height H1 in the axial direction A, and wherein the one end B3-1 of the two opposite ends of the third busbar in the circumferential direction C of the third busbar, which is disposed adjacent to the one end B1-1 of the first busbar and the one end B2-1 of the second busbar, is disposed at a second height H2 different from the first height H1 in the axial direction A.

2. The stator of claim 1, wherein the other end B1-2 of the first busbar in the circumferential direction C of the first busbar is disposed at the first height H1.

3. The stator of claim 2, wherein the other end B2-2 of the second busbar in the circumferential direction C of the second busbar is disposed at the second height H2.

4. The stator of claim 3, wherein the other end B3-2 of the third busbar in the circumferential direction C of the third busbar is disposed at the first height H1.

5. The stator of claim 1, wherein when the stator for the motor is viewed in the circumferential direction C of the stator, the other end B1-2 of the first busbar in the circumferential direction C of the first busbar overlaps the one end B2-1 of the second busbar.

6. The stator of claim 5, wherein when the stator for a motor is viewed in the circumferential direction C of the stator, the other end B2-2 of the second busbar in the circumferential direction C of the second busbar overlaps the one end B3-1 of the third busbar.

7. The stator of claim 6, wherein when the stator for the motor is viewed in the circumferential direction C of the stator, the other end B3-2 of the third busbar in the circumferential direction C of the third busbar overlaps the one end B1-1 of the first busbar.

8. The stator of claim 5, wherein the first busbar has a shape bent primarily in a direction inclined with respect to the radial direction R and the circumferential direction C of the stator and then bent secondarily in the circumferential direction C of the stator while extending from the one end B1-1 toward the other end B1-2.

9. The stator of claim 8, wherein the second busbar has a shape bent primarily in a direction inclined with respect to the axial direction A and the circumferential direction C of the stator and then bent secondarily in the circumferential direction C of the stator while extending from the one end B2-1 toward the other end B2-2.

10. The stator of claim 1, wherein the plurality of busbars further comprises a fourth busbar, wherein one end of the fourth busbar of the first assembly in a circumferential direction C of the fourth busbar of a first assembly is joined to one end of the fourth busbar of a second assembly in a circumferential direction C of the fourth busbar of the second assembly, wherein the other end of the fourth busbar of the first assembly in the circumferential direction C of the fourth busbar of the first assembly is joined to one end of the fourth busbar of a third assembly in a circumferential direction C of the fourth busbar of the third assembly, and wherein the other end of the fourth busbar of the second assembly in the circumferential direction C of the fourth busbar of the second assembly is joined to the other end of the fourth busbar of the third assembly in the circumferential direction C of the fourth busbar of the third assembly.

11. The stator of claim 10, wherein the plurality of bus-bars is disposed on an outer portion of the bobbin that is different from an inner portion of the bobbin on which the coil wound is disposed with respect to the radial direction R, the first to third busbars are disposed on a first portion of the outer portion of the bobbin based on the radial direction R, and the fourth busbar is disposed on a second portion of the outer portion of the bobbin based on the radial direction R.

12. A motor comprising:
a stator; and
a rotor,
wherein the stator has a structure in which a plurality of assemblies is arranged in a circumferential direction C and a hole is provided at a center thereof,
wherein each of the plurality of assemblies comprises:
a stator core;
a bobbin configured to surround an outer surface of the stator core;
a coil wound around the bobbin multiple times and having incoming and outgoing lines respectively provided at two opposite ends thereof; and
a plurality of busbars disposed on the bobbin,
wherein the plurality of busbars comprises a first busbar, a second busbar, and a third busbar,
wherein two opposite ends of the first busbar in a circumferential direction C of the first busbar are spaced apart from each other in the circumferential direction C and a radial direction R of the stator,
wherein two opposite ends of the second busbar in a circumferential direction C of the second busbar are spaced apart from each other in the circumferential direction C and an axial direction A of the stator, and
wherein two opposite ends of the third busbar in a circumferential direction C of the third busbar are spaced apart from each other in the circumferential direction C, the radial direction R, and the axial direction A of the stator,
wherein the third busbar has a shape bent primarily in a direction inclined with respect to the radial direction R and the circumferential direction C of the stator, bent secondarily in the circumferential direction C of the stator, bent tertiarily in a direction inclined with respect to the axial direction A and the circumferential direction C of the stator, and then bent quaternarily in the circumferential direction C of the stator while extending from one end B3-1 of the third busbar toward the other end B3-2 of the third busbar,
wherein the plurality of assemblies is classified into one or more first assemblies, one or more second assemblies, and one or more third assemblies,
wherein a first assembly, a second assembly, and a third assembly are alternately disposed in the circumferential direction C of the stator, and
wherein one end B1-1 of the first busbar of the first assembly is joined to the other end B3-2 of the third busbar of the second assembly, and the other end B1-2 of the first busbar of the first assembly is joined to one end B2-1 of the second busbar of the third assembly.

13. The stator of claim 12, wherein one end B2-1 of the second busbar of the first assembly is joined to the other end B1-2 of the first busbar of the second assembly, and the other end B2-2 of the second busbar of the first assembly is joined to the one end B3-1 of the third busbar of the third assembly.

14. The stator of claim 13, wherein the one end B3-1 of the third busbar of the first assembly is joined to the other end B2-2 of the second busbar of the second assembly, and the other end B3-2 of the third busbar of the first assembly is joined to one end B1-1 of the first busbar of the third assembly.

15. The stator of claim 14, wherein one end B1-1 of the first busbar of the second assembly is joined to the other end B3-2 of the third busbar of the third assembly.

16. The stator of claim 15, wherein one end B2-1 of the second busbar of the second assembly is joined to the other end B1-2 of the first busbar of the third assembly.

17. The stator of claim 16, wherein the one end B3-1 of the third busbar of the second assembly is joined to the other end B2-2 of the second busbar of the third assembly.

* * * * *